July 8, 1958

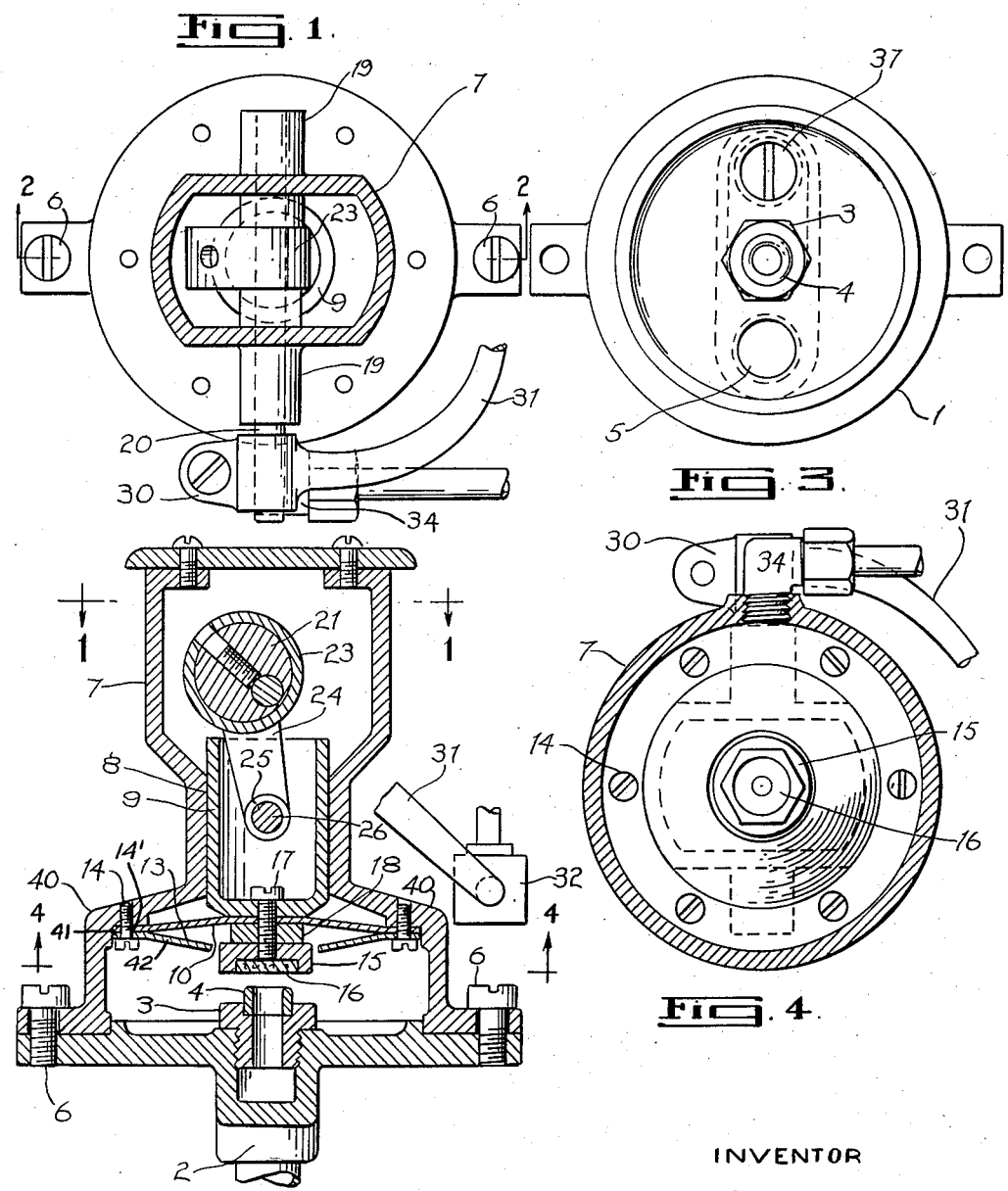

W. R. COUSINS 2,842,335

VALVES

Filed Jan. 10, 1951

INVENTOR
William R. Cousins
By
Douglas S. Johnson
ATTY.

United States Patent Office 2,842,335
Patented July 8, 1958

2,842,335

VALVES

William R. Cousins, Woodstock, Ontario, Canada

Application January 10, 1951, Serial No. 205,248

7 Claims. (Cl. 251—261)

This invention relates to improvements in valves and more particularly to an improved float-operated valve.

The principal object of the invention is to provide a compact and sturdy float valve in which the moving members are completely protected from corrosion and lime, permitting close tolerances for smooth efficient operation and extending the life of the valve indefinitely.

A further important object is to provide a valve which will have a fast opening and closing action and will be sensitive to relatively small movements of and light pressures on the float.

A further object is to provide a valve as aforesaid of simple and economical manufacture and particularly adapted for convenient and rapid installation, servicing and replacement.

The principal feature of the invention consists in arranging the moving members of the valve to operate immersed in an oil bath completely protected against corrosion and lime.

A further important feature resides in operating the valve-closing member by means of an eccentric operating at its maximum displacement in the direction of the valve closure member movement as the closure member reaches its seat to provide a fast opening and closing action.

A still further feature consists in forming the working chamber of the valve in which the moving valve members operate in their oil bath as a separate unit readily removable for servicing or replacement.

These and other objects and features will become apparent from the following description taken in conjunction with the accompanying drawings in which—

Figure 1 is a sectional plan view on the line 1—1 of Figure 2.

Figure 2 is a vertical sectional view on the line 2—2 of Figure 1.

Figure 3 is a plan view of the base of the valve with the body portion removed.

Figure 4 is a section horizontally taken on the line 4—4 of Figure 2.

Figures 5, 6:
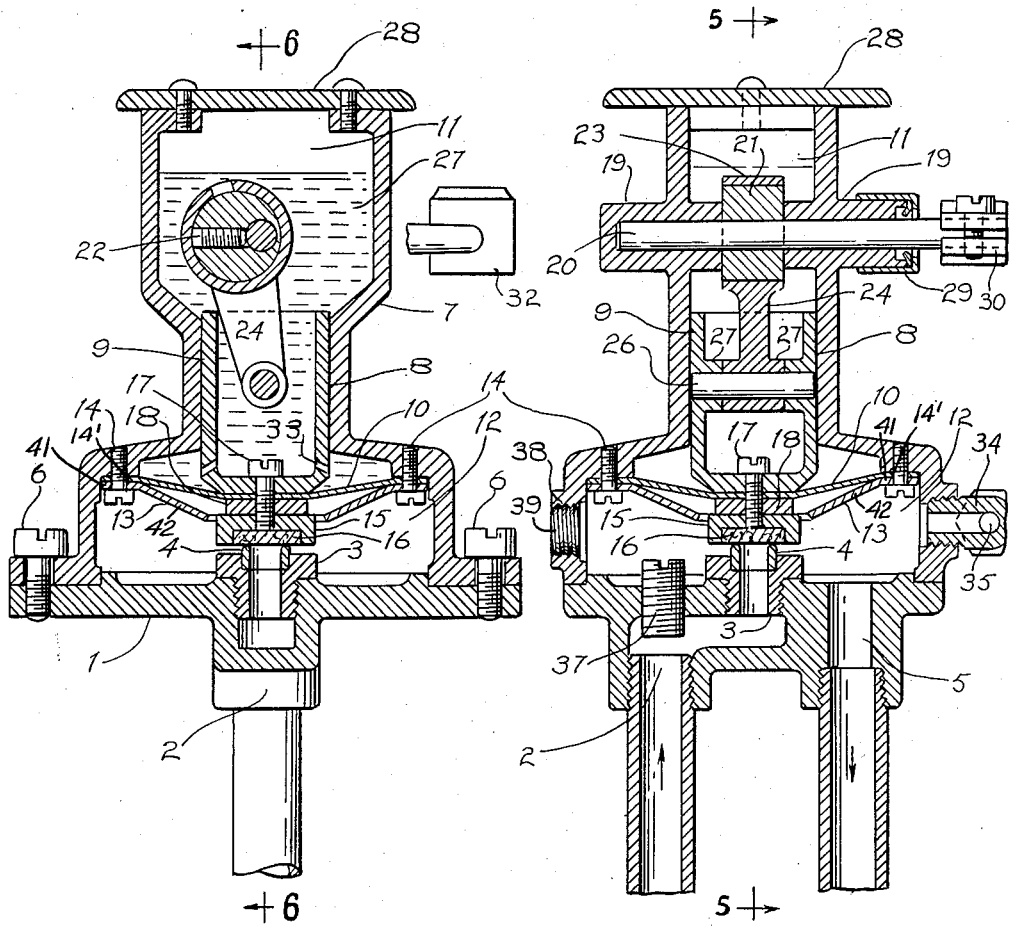
Figure 5 is a vertical sectional view similar to Figure 2 taken on the line 5—5 of Figure 6 but showing the valve closed.
Figure 6 is a vertical sectional view on the line 6—6 of Figure 5.

In the conventional present-day valve structures the moving parts are exposed to corrosion and the accumulation of lime and are subject to "freezing" after a short interval of time. To extend the valve life greater tolerances between the valve parts are allowed so that the moving parts will not seize.

While the life is extended the large tolerances results in a looseness or sloppiness in the valve movement requiring a substantial pressure on and large movements of the controlling member or float arm to actuate the valve. Additionally, any sloppyness between the parts results in chattering or shuddering of the valve in addition to the loss of efficiency in transmitting the actuating force.

It is one of the main aspects of the present invention to overcome this problem of "freezing" while at the same time maintaining the desired tolerances between these parts to provide the efficient and smooth operation, resulting in a valve which will hold its adjustment accurately and indefinitely.

With reference to the drawings, particularly Figures 2, 5 and 6, it will be seen that the valve structure comprises a base 1 which includes a water inlet 2 leading to a central orifice in which is threaded an adapter 3 supporting a valve seat 4. An outlet 5 also opens through the base 1.

Supported from the base 1 and secured thereto by bolts 6 is a body casing 7 forming a bore 8 in which a piston 9 is adapted to operate. Extending across the casing 7 is a flexible diaphragm 10 dividing the casing into an upper working chamber 11 and a lower valving chamber 12.

Securing the diaphragm 10 in place and anchoring its retainer 13 are bolts 14. The retainers 13 which are of rigid construction have a horizontal portion 41 and an inclined portion 42 extending outwardly from the point of connection 14' of the bolt 14 to prevent points of extreme stress from occurring in the diaphragm 10 at the point 14' adjacent the bolt 14 and further by providing the inclined portion, the diaphragm deformation is limited under valve closing insuring that no rupture will occur at the point of bending. Secured to the diaphragm 10 and piston 9 is a valve closure member in the form of a retainer 15 receiving a resilient insert 16 adapted to co-operate with the valve seat 4, the valve closure member being held in position by the bolt 17 and lock nut 18 clamping the flexible diaphragm to the piston.

Above the piston 9 the body casing 7 is formed with a pair of aligned bosses 19 which receive a shaft 20 on which is anchored an eccentric 21 locked by the set screw 22. The eccentric is in the form of a disc having an eccentric mounting on the shaft 20, and encircling the eccentric is the ring end 23 of a connecting rod 24 sleeved at its lower end 25 on the shaft 26 carried in the bosses 27 formed on the piston.

Within the upper working chamber 11 and covering the piston, eccentric and connecting rod is a body of oil 27 forming an oil bath in which the moving parts are immersed. Closing the top of the body casing 7 is a removable top 28.

The shaft 20 extends outwardly from the body casing through the packing 29 and has clamped thereto at its outer end by the clamp 30 a lever arm 31 which carries at its outer end a float 32.

As will be seen from Figure 5 the position of the eccentric 21 is such as the valve closure member is in contact with its seat 4 that maximum piston displacement for an increment of rotation of the shaft 20 will occur to provide a positive quick opening and quick closing action. To achieve this action the eccentric disc 21 of the shaft 20 which comprises the eccentric means have been aligned by the pin 22 to present a plane of symmetry which is parallel to the plane of closure when the valve is in the closed postion as shown in Figures 5 and 6. Further it is seen that the diameter of the eccentric disc 21 is greater than that of the shaft 2 by which the peripheral acceleration caused by the increment of rotation is multiplied by the ratio of the radii from the axis of rotation to the circumferences of the disc 21 and the shaft 20 amplifying the movement caused by the float 31.

It will be appreciated that this particular disposition in a float valve whose action is confined to describing an arc somewhat less than 90° produces the desired quick opening and closing accordingly limiting the level in a tank and thereby, achieving the precise limitations which some commercial processes specify.

Formed in the piston 9 are orifices 33 which permit free circulation of the oil in the working chamber 11 as the piston is operated through the float 32.

Leading from the valving chamber 12 is a by-pass outlet 34 having a reduced bore 35 in parallel with the outlet 5 but by-passing only a limited quantity of water delivered through the inlet 2. The valve illustrated is particularly adapted for use in a toilet tank and the by-pass outlet 34 permits a portion of the output flow to be directed, for instance, to the rim.

The volume of inlet flow is controlled by an adjustable plug 37 which is adapted to progressively extend into the inlet 2.

The body casing 7 is threaded at 38 diametrically opposite the by-pass outlet 34 to permit the by-pass to be connected at this point if desired, and the threaded opening 38 is temporarily closed by the plug 39.

It will be seen therefore that the body casing 7 forms a separate unit readily releasable by undoing the bolts 6 for replacement or servicing, or if desired the body casing can be rotated through 180° as will be seen from Figure 1, and the by-pass outlet 38 can be used.

The piston 9 has a close tolerance with respect to its bore 8 and operates smoothly and in complete protection in its oil bath to effect a valving action with relatively little motion of the float arm, which motion is transmitted efficiently through the eccentric 21 and connecting rod 24. The parts without sloppiness or looseness provide positive piston operation with relatively light pressure on the float.

Since the float arm 31 and float 32 need only a relatively small movement to effect operation of the valve the float can be kept clear, for instance, of other mechanism used at the bottom of the ordinary toilet tank, and the flare of the body casing 7 provide stops at 40 which limit downward float movement and the valve operates in and occupies a minimum of space providing an extremely convenient structure.

What I claim as my invention is:

1. In a valve structure, a body casing defining a working chamber, including a reduced waist portion defining a piston receiving bore, a flexible diaphragm closing said chamber adjacent one end of said bore, a body of oil inside said chamber forming an oil bath, a piston operating in snug sliding fit in said piston receiving bore and connected to said flexible diaphragm, a valve closure member secured to said diaphragm and piston exteriorly of said chamber adapted to co-operate with a valve seat aligned with said bore and piston, an eccentric operating in said chamber adjacent the end of said bore opposite the said diaphragm, and a connecting rod directly connecting said eccentric and piston, means for operating said eccentric, said eccentric having an eccentricity to amplify the movement of said operating means and having a plane of symmetry, said plane of symmetry being disposed parallel to the plane of said valve seat with said valve closure member in closed position, said eccentric, connecting rod, and piston all operating immersed in said oil bath to move said diaphragm and said valve closure member to provide a valving action.

2. In a valve structure, a valve seat, a chamber opposite to said valve seat, a flexible diaphragm diving said chamber into a valving chamber and a working chamber sealed from said valving chamber, said working chamber including a piston guiding portion aligned with said valve seat, a body of oil in said working chamber forming an oil bath, a piston reciprocally arranged in the piston guiding portion of said working chamber for substantially pure linear movement towards and from said valve seat, a valve closure member adapted to co-operate with said valve seat arranged in said valving chamber and secured to said diaphragm, an eccentric rockably supported in said working chamber, a connecting rod pivoted to said eccentric and piston and converting rocking movement of the eccentric into reciprocal movement of said piston, and means for rocking said eccentric member, said eccentric being constructed to amplify the movement of said rocking means and having a plane of symmetry, said plane of symmetry being disposed parallel to the plane of said valve seat with said closure member in closed position.

3. A device as claimed in claim 2 in which said eccentric comprises a circular member eccentrically mounted on a rock shaft, and said connecting rod includes a ring portion encircling said circular member and an extension from said ring portion pivoted to said piston.

4. In a float valve having a valve seat, a hollow body casing, a flexible diaphragm within said casing defining a working chamber and a valving chamber including said valve seat and with said working chamber sealed from fluid communication with said valving chamber and valve seat, said working chamber being formed with a reduced waist portion defining a piston-receiving bore aligned with said valve seat, an inlet through said valve seat, an outlet from said valving chamber, a body of oil in said working chamber forming an oil bath, a piston operating in snug sliding fit in said bore under continuous lubrication by the oil of said bath for substantially pure linear motion perpendicular to said valve seat, said piston being connected to said flexible diaphragm, an eccentric rockably mounted above said piston in said working chamber, a float arm connected to rock said eccentric, said eccentric being constructed to amplify the movement of said rocking means and having a plane of symmetry, said plane of symmetry being disposed parallel to the plane of said valve seat with said closure member in closed position, a connecting rod pivotally connected to said eccentric and to said piston, said piston, connecting rod, and eccentric being immersed in said oil bath, and a valve closure member adapted to co-operate with said valve seat arranged in said valving chamber and connected to said diaphragm and piston to be actuated thereby.

5. A device as claimed in claim 4 in which said piston is of cup form and is provided with oil by-pass orifice means permitting free oil circulation in said working chamber upon valve movement.

6. A device as claimed in claim 4 in which rigid retaining means project beneath said flexible diaphragm limiting diaphragm deformation under valve closing.

7. A device as claimed in claim 4 in which said eccentric comprises a circular member eccentrically mounted on a rock shaft and said connecting rod includes a ring portion encircling said circular member and an extension from said ring portion pivoted to said piston, said circular member having its dimension measured in the direction of its maximum eccentricity and through said rock shaft located substantially perpendicular the direction of said bore as said valve closure member moves into and out of contact with said valve seat.

References Cited in the file of this patent

UNITED STATES PATENTS

| | | |
|---|---|---|
| 478,963 | Hankenhof | July 12, 1892 |
| 543,259 | Melvin | July 23, 1895 |
| 859,371 | Coyle | July 9, 1907 |
| 865,568 | Cooper | Sept. 10, 1907 |
| 967,339 | Dehn | Aug. 16, 1910 |
| 970,082 | Morehead | Sept. 13, 1910 |
| 1,163,370 | Ryan | Dec. 7, 1915 |
| 1,128,426 | Dunham | Feb. 16, 1915 |
| 1,172,977 | Gillen | Feb. 22, 1916 |
| 1,672,366 | Cadwell et al. | June 5, 1928 |
| 1,908,207 | Wrenn | May 9, 1933 |
| 2,088,426 | Lofton | July 27, 1937 |
| 2,227,914 | Saunders | Jan. 7, 1941 |
| 2,549,041 | Anderson | Apr. 17, 1951 |